March 22, 1966 G. PUSCH ETAL 3,241,567
PILOT OPERATED RELIEF VALVE
Filed June 26, 1964
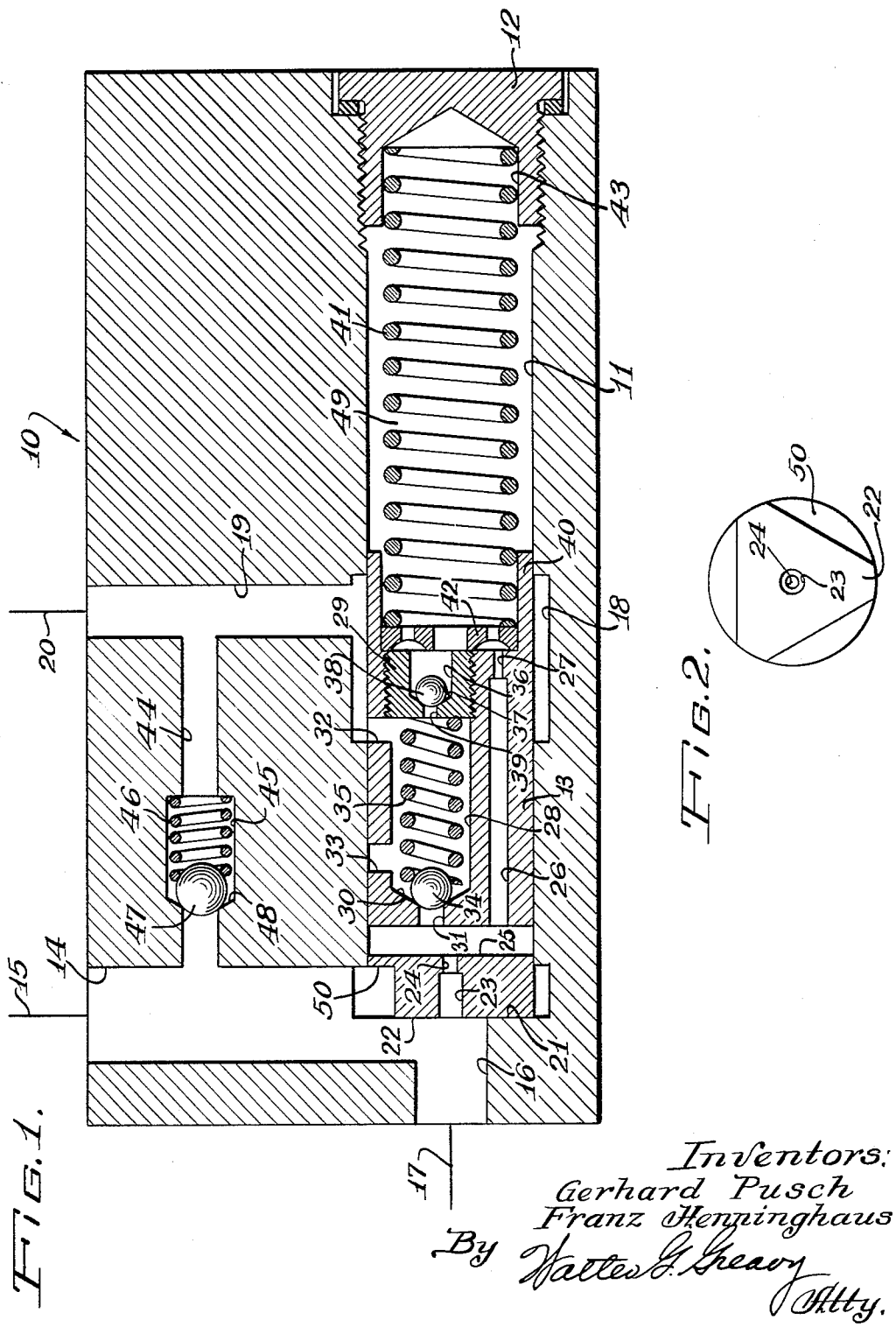
Inventors:
Gerhard Pusch
Franz Henninghaus
By Walter G. Geary
Atty.

United States Patent Office 3,241,567
Patented Mar. 22, 1966

3,241,567
PILOT OPERATED RELIEF VALVE
Gerhard Pusch, Neuss, and Franz Henninghaus, Dusseldorf, Germany, assignors to International Harvester Company, Chicago, Ill., a corporation of New Jersey
Filed June 26, 1964, Ser. No. 378,102
6 Claims. (Cl. 137—490)

This invention relates to hydraulic valves and particularly to a pilot-operated safety or relief type valve applicable for use with position and draft control hydraulic systems incorporated in agricultural tractor vehicles.

In systems of this character, the maximum operating pressure is usually limited by a safety or relief valve that protects the system against overloading. However, in such systems an operating condition may develop wherein the control valve thereof is not returned to neutral position when the demand for fluid pressure ceases and as a consequence the hydraulic pump in the system is forced to work against a maximum operating pressure. Since the fluid is usually relieved by way of the relief valve thereof considerable heat is developed and this means a substantial power loss and the possibility of damage as a result of the heating.

In an endeavor to overcome such drawbacks attempts have been made to provide relief valves in the form of piston valves provided with differential areas wherein the smaller area, which was coordinated with the spring pressure of the valve, was adapted to normally receive the normal operating pressure, and then when the valve opened the larger area was acted upon whereupon the subsequent low pressure was sufficient to allow the fluid to flow off. However, in such an arrangement the valve could not close so as to permit the build up of normal operating pressure until the pressure in the main line decreased below this low pressure.

Another disadvantage to such prior valving devices resided in the fact that the area ratio could not be selected larger than approximately 1:3 so that the circulating or by-pass pressure was still about one third that of the maximum operating pressure. Furthermore, such valves tended to open as soon as the operating pressure was exceeded by a pressure peak and when such peaks occurred as a result of acceleration of large masses it caused an unintentional shut-off of the valve.

The primary object of the present invention therefore is to provide a valve mechanism that overcomes the aforementioned shortcomings of such prior art valves.

Another object is to provide a pilot-operated relief valve that is operative to maintain a very low circulating or by-pass pressure after shut off.

A further object is to provide a pilot-operated safety valve that is operative to remove pressure peaks, resulting from surges or acceleration peaks, without shutting off fluid flow to an associated hydraulic device.

A still further object is to provide a pilot-operated relief valve wherein a spring loaded piston has a frontal area that is subjected to inlet fluid pressure of an associated hydraulic system, while a rearward area of the piston is connected to the inlet fluid pressure through a throttling orifice and a chamber encompassing said rearward area is connectible to a fluid reservoir through a pilot valve within said piston, and wherein a pilot passage provides a connection for freely connecting the chamber behind the piston to the fluid reservoir after a predetermined piston travel.

A further object is to provide a pilot-operated safety or relief valve wherein a chamber behind a piston therein is connected to a pilot line and to a pilot valve in said piston through a throttling orifice whereby a cushioning chamber is provided that causes inlet pressure fluid to flow through the pilot valve when high, short time pressure peaks occur so as to relieve said peaks and prevent opening said safety or relief valve until the maximum operating pressure has been exceeded for a relatively long period of time.

A yet still further object is to provide a pilot-operated safety or relief valve assembly having an additional relief valve associated therewith and connected in a parallel flow relationship thereto and which is set at a slightly higher operating pressure than the safety valve whereby short time pressure peaks may be relieved without operation of said pilot-operated safety valve.

Another important object is to provide a pilot-operated safety or relief valve wherein a cushioning chamber behind a piston therein is connected to a pilot line and to a pilot valve in said piston through a throttling orifice, and by way of a unidirectional check valve with a pressure return, whereby said cushioning chamber is rapidly filled with fliud when an associated hydraulic system no longer requires working pressure such as when a control valve of an associated position and draft control system is returned to its neutral position.

Other objects and advantages will be understood and will become more apparent from the following description when read in conjunction with the accompanying drawing in which:

FIGURE 1 is a vertical and longitudinal sectional view, of the valve assembly of the present invention.

FIGURE 2 is an end elevational view of the piston of said valve assembly.

The proposed valve assembly of the present invention is shown for purposes of illustration as being utilized with a hydraulic system adapted for use with the position and draft control elements of an agricultural tractor wherein, as is well known, a vehicle attached ground-working implement is elevated or lowered according to the draft demands thereon. Since the other components and control elements of said system are not pertinent to an understanding of the operation of the proposed valve assembly the details thereof have been omitted from the description and drawings hereof.

A casing or housing, indicated generally by the reference numeral 10, may be independently fashioned or formed as part of the housing which contains the control valves of the associated hydraulic system. Housing 10 has a longitudinally extending bore 11 therein that opens at one end thereof and said opening is closed by a plug 12 threaded therein and a piston 13 is slidably positioned within said bore. Housing 10 is further provided with a passage 14 that opens into one end of bore 11 and at the opposite end said passage is adapted for connection by a suitable conduit such as is represented at 15 to the pump or fluid pressure source (not shown) of the associated hydraulic system. An additional passage 16 opens at one end into passage 14 and at the opposite end said first passage is adapted for connection by way of a suitable conduit such as is indicated at 17 to the control valve (not shown) of said associated hydraulic system. An annular recess 18 opens into bore 11 and connects with one end of a passage 19 the opposite end of which passage is adapted for connection by a suitable return conduit such as is indicated at 20 to the sump or fluid reservoir (not shown) of the associated hydraulic system.

An abutment portion 21 of housing 10 projects into passage 14 and serves as a stop for the front surface 22 of piston 13. Said piston is fashioned with an axially extending opening 23 therein that opens into a throttling orifice 24 which, in turn, opens into a transverse pilot passage 25. Extending from said transverse passage is a longitudinally extending passage 26 that opens into a throttling orifice 27 which, in turn, opens into the interior of bore 11 behind piston 13. A bore 28 in piston 13 has one end thereof closed by a threaded plug 29 while the opposite end of said bore is fashioned to provide a tapered valve seat 30, and an axial passage 31 opening adjacent said seat interconnects the transverse pilot passage 25 with the interior of bore 28. Radially extending passages 32, 33 communicatively connect the interior of bore 28 with the interior of bore 11. The latter passages are disposed so that one of said passages regardless of the position of piston 13 is always in fluid communication with the annular recess 18 which, in turn, connects with the fluid reservoir of the associated hydraulic system.

Positioned within the bore 28 is a ball pilot valve 34 which is normally held against valve seat 30 by a coil spring 35 the opposite end of which spring is seatably positioned against the closure plug 29. An axially extending bore 36 in closure plug 29 opens at one end into the interior of bore 11 and at the opposite end said first bore is fashioned with a tapered valve seat 37 which seats a ball 38 thereagainst, and an axially extending passage 39 opening adjacent seat 37 interconnects the interior of bore 28 with the interior of bore 36. One end of piston 13 is fasihoned with a skirt portion 40 which extends beyond the closure plug 29 and slidably accommodates one end of a spring 41 which seats against a perforate cam disk 42 disposed in abutting engagement with said closure plug, while the opposite end of said spring seats within a recess 43 in closure plug 12.

A longitudinally extending passage 44 interconnecting passage 14 with passage 19 has an enlarged portion 45 therein that accommodates a spring 46 and a ball 47 seated against a seat 48 at one end of said enlarged portion and said ball is normally held against said seat by spring 46 to provide an auxiliary relief valve.

OPERATION

In the normal non-operated position of the valve, as shown in FIGURE 1, the pressure in inlet passage 14, pilot passage 25 and chamber 49 behind piston 13 is equalized because of the interconnecting passages 23, 26 and orifices 24, 27. When the pressure in passage 14 exceeds the pressure at which pilot valve 34 is set to release, by virtue of the positioning of closure plug 29, said pilot valve 34 will open against spring 35 and permit fluid flow from transverse pilot passage 25 through the interior of bore 28, passage 32, annular groove 18, passage 19 to conduit 20 and the associated fluid reservoir. In such event the orifice 24 causes a pressure gradient between passage 14 and pilot passage 25, and the same pressure gradient also exists between chamber 49 and inlet passage 14. Hence, fluid will flow not only from passage 14 through orifice 24 and pilot valve 34 but also from chamber 49 through orifice 27 and the interconnected passages to the associated reservoir. The rate at which fluid flows from chamber 49 and the speed with which piston 13 slides axially toward shut-off position is governed by the relationship of the size of orifice 27, the reactive force or resistance of spring 41 and the cross-sectional area of piston 13. During such movement of piston 13 the interior of bore 28 remains in fluid communication with return passage 19 through either passage 32 or passage 33, and the pressure in inlet passage 14 equals the set operating pressure of valve 34 plus the pressure gradient produced by throttling orifice 24.

In the event the set operating pressure of pilot valve 34 is exceeded over a period of time long enough to permit piston 13 to move far enough to the right, as viewed herein, so that the transverse pilot passage 25 is established in free communication with annular groove 18, the pressure in said pilot passage will decrease to substantially zero as will the pressure in the interior of bore 28, whereupon pilot valve 34 will close and the shut-off position of the piston valve wil have been reached. When piston 13 has moved sufficiently for the control edge 50 at one end of said piston to overlap annular groove 18 fluid flow from pressure passage 14 will flow over said control edge to said groove and thereby provide a throttling position that maintains a low pressure in passage 14. This low pressure which may be termed a bypass or circulating pressure is very low since it amounts to a mere fraction of the normal operating pressure in said passage and will be determined by the relationship between the force of the spring 41 and the cross-sectional area of piston 13. In this position of piston 13 a portion of the fluid in passage 14 will also flow in a parallel path by way of orifice 24 and passage 25 to the return passage 19.

As long as the associated hydraulic system remains closed and there is no demand for fluid pressure therein, such as would be the case if the control valve of the associated hydraulic system remained in the implement lifting position thereof without the implement lifting and the source of fluid pressure continued to be delivered, the pilot-operated piston valve 13 will remain in the latter axially displaced position and hence only a low by-pass or circulating pressure will be delivered therethrough. This condition will continue until the pressure condition is relieved such as would occur when the control valve of the associate system was returned to neutral. Subsequently, the pressure in passages 14 and 16 drops below the level required to keep said latter valve in open position against the reactive force of spring 41 whereupon piston 13 will move back to its initial position and pressure can against build up to full operating pressure when required such as would be the case when the associated control valve is again set to its implement lifting position.

When the piston 13 is moved from its shut-off position back to its initial non-operated position the chamber 49 must be filled again with fluid. However, since this chamber is connected to the return passage 19 by way of throttling orifice 27 there is introduced a certain delay in any movement thereof which, delay in turn, operates to produce a faster shut-off in case of change-over operations in quick succession in an associated hydraulic system. However, in order to overcome the effect of such delay in refilling chamber 49 the check valve 38 is provided and so arranged as to permit overflowing of fluid from the interior of bore 28 through passage 39 into chamber 49 thereby filling said chamber and permitting piston 13 to be returned to its initial position without delay.

When the proposed valve is used in association with a pump having a substantial delivery capacity it is possible that pressure peaks may occur, because of the delay of the shut-off process, that cannot be eliminated completely since the fluid flowing off through pilot valve 34 must also flow through the throttling orifice 24 thus leading to an undue pressure increase. In such event it becomes desirable to effect a parallel flow path by way of the auxiliary relief valve 47 which is set somewhat higher than pilot valve 34. In this manner the quantity of fluid flowing off through the throttling orifice 24 is reduced without impairing the effectiveness of piston valve 13. Hence, even at a high delivery of the associated fluid pressure source, pressure peaks that exceed the set operating pressure may be eliminated.

From the above it will be seen that the proposed valve assembly represents a safety or relief means to prevent overloading an associated hydraulic system and which, additionally, operates to provide a very low by-pass or circulating pressure even when the associated system no longer demands fluid pressure such as when the control valve of an associated hydraulic draft and position control system remains in the position for implement lifting without lifting the attached implement. By means of the delay provided, pressure peaks that result from surges or mass accelerations during changeover are eliminated. Furthermore, the valve does not shut off until the operating pressure is exceeded for a long period of time, and, in addition, said proposed valve does not permit build-up of operating pressure until the demand therefor exists such as when the control valve of said associated hydraulic system has been changed over from neutral.

While only one form of the invention has been shown, it will be obvious to those skilled in the art that it is not so limited but is susceptible of various changes and modifications without departing from the spirit thereof, and it is desired, therefore, that only such limitations shall be placed thereupon as are specifically set forth in the appended claims.

We claim:

1. A hydraulic valve mechanism comprising: a body having an inlet therein adapted for connection with a source of fluid pressure, a first outlet adapted for connection to a fluid reservoir and a second outlet adapted for connection to a hydraulic system; means forming a pressure passage communicatively interconnecting said inlet and second outlet; means forming a return passage communicating at one end with said first outlet; said body having a bore therein opening at one end into said pressure passage, the opposite end being closed, and having a piston slidably disposed therewithin; resilient means in said bore normally urging said piston toward the open end of said bore; pilot valve means disposed in said piston and normally biased to a closed position but being preset to open at a predetermined pressure; first and second means forming passages in said piston respectively communicatively interconnecting said pressure and return passages with said pilot valve means; third means forming a passage communicatively interconnecting a portion of said first passage means and the area of said bore behind said piston whereby fluid flow from said inlet into said area provides a cushioning means for said piston; said pilot valve being operative when the pressure in said pressure passage momentarily exceeds that for which said pilot valve is preset for establishing fluid flow therethrough between said pressure and return passages; said piston being slidable for establishing a low pressure by-pass fluid flow between said pressure and return passages without passing through said pilot valve when the excess pressure in said pressure passage persists and being further operative for maintaining said by-pass fluid flow so long as the excess pressure in said pressure passage persists; and having said cushioning means operative to provide a delaying action in the movement of said piston whereby said piston slides only upon persistent subjection of said piston to excess pressure; and auxiliary relief valve means disposed in said body communicatively interconnecting said pressure and return passages and normally biased to a closed position to restrict fluid flow between said pressure and return passages, but being preset to open at a predetermined pressure higher than that at which said piston and pilot valving means are preset for communicatively interconnecting said pressure and return passages to accommodate pressure surges in said pressure passage without affecting operation of said piston or pilot valve means.

2. A hydraulic valve mechanism comprising: a body having an inlet therein adapted for connection with a source of fluid pressure, a first outlet adapted for connection to a fluid reservoir and a second outlet adapted for connection to a hydraulic system; means forming a pressure passage communicatively interconnecting said inlet and second outlet; means forming a return passage communicating at one end with said first outlet; said body having a bore therein opening at one end into said pressure passage, the opposite end being closed, and having a piston slidably disposed therewithin; resilient means in said bore normally urging said piston toward the open end of said bore; pilot valve means disposed in said piston and normally biased to a closed position and preset to open at a predetermined pressure; first means forming a passage communicatively interconnecting said pressure passage with said pilot valve, and second means forming a plurality of passages communicatively interconnecting said pilot valve with said return passage and arranged so that said pilot valve regardless of the position thereof is always in communication by way of one of said plurality of passages with said return passage; third means forming a passage communicatively interconnecting a portion of said first passage means and the area of said bore behind said piston whereby fluid is free to flow from said inlet into said area to provide a cushioning means for said piston; said pilot valve being operative when the pressure in said pressure passage momentarily exceeds that for which said pilot valve is preset for establishing fluid flow therethrough between said pressure and return passages; said piston being slidable to permit fluid flow from said first passage means to said return passage without passing through said pilot valve for establishing a low pressure by-pass flow therebetween when the excess pressure in said pressure passage persists, and being further operative for maintaining said low pressure by-pass flow so long as the excess pressure in said pressure passage persists; and having said cushioning means operative to provide a delaying action in the movement of said piston whereby said piston slides only upon persistent subjection of said piston to excess pressure.

3. A hydraulic valve mechanism comprising: a body having an inlet therein adapted for connection with a source of fluid pressure, a first outlet adapted for connection to a fluid reservoir and a second outlet adapted for connection to a hydraulic system; means forming a pressure passage communicatively interconnecting said inlet and second outlet; means forming a return passage communicating at one end with said first outlet; said body having a bore therein opening at one end into said pressure passage, the opposite end being closed, and having a piston slidably disposed therewithin; resilient means in said bore normally urging said piston toward the open end of said bore; pilot valve means disposed in said piston and normally biased to a closed position and preset to open at a predetermined pressure; first and second means forming passages in said piston respectively communicatively interconnecting said pressure and return passages with said pilot valve means; third means forming a passage communicatively interconnecting a portion of said first passage means and the area of said bore behind said piston whereby fluid flow from said inlet into said area provides a cushioning means for said piston; said pilot valve being operative when the pressure in said pressure passage exceeds that for which said pilot valve is preset for establishing fluid flow therethrough between said pressure and return passages; said piston being slidable to permit fluid flow from said pressure to said return passages without passing through said pilot valve for establishing a low pressure by-pass flow therebetween when the excess pressure in said pressure passage persists; said cushioning means being cooperative with said resilient means to oppose the movement of said piston and to provide a delaying action in the movement thereof whereby said piston does not move unless the excess pressure persists; and unidirectional valve means disposed in said piston between said pilot valve and downstream thereof and the area behind said piston and disposed for opening to permit fluid flow from said pilot valve to said area to permit rapid filling of said area with fluid but being operative to restrict fluid flow from said area to the downstream side of said pilot valve.

4. A hydraulic valve mechanism comprising: a body having an inlet therein adapted for connection with a source of fluid pressure, a first outlet adapted for connection to a fluid reservoir and a second outlet adapted for connection to a hydraulic system; means forming a pressure passage communicatively interconnecting said inlet and second outlet; means forming a return passage communicating at one end with said first outlet; said body having a bore therein opening at one end into said pressure passage, the opposite end being closed, and having a piston slidably disposed therewithin; resilient means in said bore normally urging said piston toward the open end of said bore; pilot valve means disposed in said piston and normally biased to a closed position and preset to open at a predetermined pressure; first and second means forming passages in said piston respectively communicatively interconnecting said pressure and return passages with said pilot valve means; said first passage means including a pilot passage transversely disposed relative to said piston, a first axial passage including a flow restricting therein communicatively interconnecting said pressure and pilot passages and a second axial passage communicatively interconnecting said pilot passage and said pilot valve; third means forming a passage including a flow restricting orifice therein communicatively interconnecting said pilot passage and the area of said bore behind said piston whereby fluid flow from said inlet is throttled into said area and provides a cushioning means for said piston; said pilot valve being operative when the pressure in said pressure passage exceeds that for which said pilot valve is preset for establishing fluid flow therethrough between said pressure and return passages; said piston being slidable to permit fluid flow from said pressure to said return passages without passing through said pilot valve for establishing a low pressure by-pass flow therebetween when the excess pressure in said pressure passage persists; said cushioning means being cooperative with said resilient means to oppose the movement of said piston and to provide a delaying action in the movement thereof whereby said piston does not move unless the excess pressure persists; and unidirectional valve means disposed in said piston between said pilot valve and downstream thereof and the area behind said piston and disposed for opening to permit fluid flow from said pilot valve to said area to permit rapid filling of said area with fluid but being operative to restrict fluid flow from said area to the downstream side of said pilot valve.

5. A hydraulic valve mechanism comprising: a body having an inlet therein adapted for connection with a source of fluid pressure, a first outlet adapted for connection to a fluid reservoir and a second outlet adapted for connection to a hydraulic system; means forming a pressure passage communicatively interconnecting said inlet and second outlet; means forming a return passage communicating at one end with said first outlet; said body having a bore therein opening at one end into said pressure passage, the opposite end being closed, and having a piston slidably disposed therewithin; resilient means in said bore normally urging said piston toward the open end of said bore; pilot valve means disposed in said piston and normally biased to a closed position and preset to open at a predetermined pressure; first and second means forming passages in said piston respectively communicatively interconnecting said pressure and return passages with said pilot valve means; said first passage means including a pilot passage transversely disposed relative to said piston, a first axial passage including a flow restricting orifice therein communicatively interconnecting said pressure and pilot passages and a second axial passage communicatively interconnecting said pilot passage and said pilot valve; third means forming a passage including a flow restricting orifice therein communicatively interconnecting said pilot passage and the area of said bore behind said piston whereby fluid flow from said inlet is throttled into said area and provides a cushioning means for said piston; said pilot valve being operative when the pressure in said pressure passage exceeds that for which said pilot valve is preset for establishing fluid flow therethrough between said pressure and return passages; said piston being slidably operative responsive to pressure against one end of said piston to a first position wherein said pilot passage is established in free fluid flow communication with said return passage, and to a second position wherein an end edge of said piston overlaps said return passage and provides a restricted passage for flow of fluid from said pressure passage to said return passage; and having said cushioning means cooperative with said resilient means to oppose the movement of said piston and to provide a delaying action in the movement thereof whereby said piston does not move unless the excess pressure in said pressure passage persists.

6. A hydraulic valve mechanism comprising: a body having an inlet therein adapted for connection with a source of fluid pressure, a first outlet adapted for connection to a fluid reservoir and a second outlet adapted for connection to a hydraulic system; means forming a pressure passage communicatively interconnecting said inlet and second outlet; means forming a return passage communicating at one end with said first outlet; compound acting valve means disposed in said body communicating with said pressure and return passages, and including a piston valve slidable in a bore formed in said body and a pilot valve fashioned within said piston; means biasing said valving means including a first resilient element normally urging said piston toward and with a portion of said piston projecting into said pressure passage but disposed so as to normally permit free fluid flow from said inlet to said second outlet while restricting fluid flow from said inlet to said first outlet, and a second resilient element urging said pilot valve to a closed position for normally restricting the flow of fluid therethrough; said pressure passage being provided with stop means disposed to engage one end of said piston so as to prevent said piston from ever completely blocking the flow of fluid from said inlet to said second outlet; said valving means being operative upon development of a momentary increase in pressure in said pressure passage in excess of that for which said valving means is biased for initially communicatively interconnecting said inlet and said first outlet through said pilot valve, and being further operative subsequently for establishing a low pressure circulating fluid flow between said pressure and return passages without passing through said pilot valve when said excess pressure persists and finally for maintaining said circulating flow so long as said excess pressure persists.

References Cited by the Examiner
UNITED STATES PATENTS

| | | | |
|---|---|---|---|
| 2,601,870 | 7/1952 | Lee | 137—490 |
| 2,991,796 | 7/1961 | Griswold | 137—489 |
| 3,077,898 | 2/1963 | Raymond | 137—491 |
| 3,088,488 | 5/1963 | Benner et al. | 137—596.13 X |
| 3,129,720 | 4/1964 | Allen et al. | 137—490 |

FOREIGN PATENTS

| | | |
|---|---|---|
| 403,632 | 12/1933 | Great Britain. |
| 740,318 | 11/1955 | Great Britain. |
| 359,757 | 7/1938 | Italy. |

MARTIN P. SCHWADRON, *Primary Examiner.*